(12) United States Patent
Yamazaki et al.

(10) Patent No.: US 8,803,370 B2
(45) Date of Patent: Aug. 12, 2014

(54) WIRELESS POWER FEEDING SYSTEM AND WIRELESS POWER FEEDING METHOD

(75) Inventors: Shunpei Yamazaki, Tokyo (JP); Jun Koyama, Kanagawa (JP); Yoshiyuki Kurokawa, Kanagawa (JP); Yutaka Shionoiri, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 562 days.

(21) Appl. No.: 13/156,483

(22) Filed: Jun. 9, 2011

(65) Prior Publication Data
US 2011/0309688 A1   Dec. 22, 2011

(30) Foreign Application Priority Data
Jun. 17, 2010  (JP) ................... 2010-138605

(51) Int. Cl.
  *H01H 9/54*  (2006.01)
(52) U.S. Cl.
  USPC ........................................................ 307/140
(58) Field of Classification Search
  USPC ........................................................ 307/140
  See application file for complete search history.

(56) References Cited

U.S. PATENT DOCUMENTS

2012/0025631 A1*  2/2012  Shionoiri et al. ............. 307/149

FOREIGN PATENT DOCUMENTS

| JP | 2010-119246 A | 5/2010 |
| WO | 2010/055381 A1 | 5/2010 |

* cited by examiner

Primary Examiner — Robert L. Deberadinis
(74) Attorney, Agent, or Firm — Fish & Richardson P.C.

(57) ABSTRACT

An object is to provide a power feeding system and a power feeding method which are higher convenient for a power feeding user on the power receiving side. Another object is to provide a power feeding system and a power feeding method which can offer efficient services by determining or managing a power feeding user and controlling the amount of power supplied to the power receiver appropriately by a company on the power feeding side. A power feeding device which supplies power to a power receiver wirelessly manages the power receiver on the basis of identification information of the power receiver and controls power transmitted to the power receiver on the basis of position information of the power receiver.

8 Claims, 9 Drawing Sheets

WIRELESS POWER FEEDING SYSTEM AND WIRELESS POWER FEEDING METHOD

BACKGROUND OF THE INVENTION

1. Field of the Invention

The present invention relates to a wireless power feeding system and a wireless power feeding method.

2. Description of the Related Art

In recent years, electronic devices using electric power as a prime mover, which are typified by mobile devices such as mobile phones or laptop personal computers, are often used while being carried.

In addition, transportation means such as bicycles and automobiles which use electric power as a prime mover have been developed in terms of its cleanness and safety in the aspect of environment.

Electronic devices and transportation means which are used outside the house or while traveling are difficult to supply power constantly by a wire from a commercial power supply distributed to each house. Therefore, portable electronic devices and transportation means are provided with batteries which are charged from a commercial power supply in advance and operate by supplying power from the batteries.

Since operation period of the electronic device is limited by the amount of power storage of the battery, a user needs to prepare a spare battery or search a commercial power supply, from which the battery can be charged, outside the house, in order to use the electronic device continuously for a long time.

Therefore, a power feeding system in a contactless manner has been proposed and a power feeding system with higher efficiency in which a problem of an obstacle or the like has been considered is studied so that power feeding to the battery can be performed without a commercial power supply (see Patent Document 1).

REFERENCE

Patent Document

[Patent Document 1] Japanese Published Patent Application No. 2010-119246

SUMMARY OF THE INVENTION

However, in a power feeding system in a contactless manner, there is a problem in that it is difficult to determine or manage a power feeding user on the power receiving side, control the amount of power supplied to the power receiver, and the like due to contactless.

Therefore, an object is to provide a power feeding system and a power feeding method which are more convenient for a power feeding user on the power receiving side.

Another object is to provide a power feeding system and a power feeding method which can offer efficient services by determining or managing a power feeding user on the power receiving side and controlling the amount of power supplied to the power receiver appropriately by a company on the power feeding side.

A power feeding device which supplies power to a power receiver wirelessly manages the power receiver on the basis of identification information of the power receiver and controls power transmitted to the power receiver on the basis of position information of the power receiver.

The power receiver and the power feeding device each include a transmission/reception circuit portion which transmits and receives electromagnetic waves transmitted from each other and a signal processing circuit portion which processes electrical signals of the transmitted and received electromagnetic waves. The signal processing circuit portion in the power receiver has a position detection function of detecting the position of the power receiver to figure out a positional relation between the power feeding device and the power receiver and a power reception control function of controlling power received from the power feeding device. The signal processing circuit portion in the power feeding device has an identification function of identifying identification information of the power receiver and a power transmission control function of controlling power transmitted to the power receiver.

The power receiver includes a power receiving device portion and a power load portion and can operate the power load portion using power stored in a power storage portion in the power receiving device portion. In this specification, a power receiver means an object which operates using received power as a prime mover and examples of the power receiver include portable electric devices such as mobile phones, transportation means driven by an electric motor using power (automobiles, motorized bicycles, aircrafts, ships, and railroad cars), and the like.

An embodiment of a power feeding system disclosed in this specification includes a power feeding device and a power receiver including a power receiving device portion and a power load portion. The power feeding device includes a transmission/reception circuit portion for the power feeding device which transmits and receives electromagnetic waves, a signal processing circuit portion for the power feeding device which processes an electrical signal of the electromagnetic wave transmitted to and received from the transmission/reception circuit portion for the power feeding device, and a power supply portion which supplies power transmitted to the power receiver. The power receiving device portion includes a transmission/reception circuit portion for the power receiving device portion which transmits and receives electromagnetic waves, a signal processing circuit portion for the power receiving device portion which processes an electrical signal of the electromagnetic wave transmitted to and received from the transmission/reception circuit portion for the power receiving device portion, a memory portion having identification information of the power receiver, and a power storage portion including a secondary battery which stores power transmitted from the power feeding device. The signal processing circuit portion for the power feeding device has an identification function of identifying the identification information and a power transmission control function of controlling power transmitted to the power receiver. The transmission/reception circuit portion for the power receiving device portion has a position detection function of detecting a position of the power receiver and a power reception control function of controlling power received from the power feeding device.

An embodiment of a power feeding system disclosed in this specification includes a power feeding device and a power receiver including a power receiving device portion and a power load portion. The power feeding device includes a transmission/reception circuit portion for the power feeding device which transmits and receives electromagnetic waves, a signal processing circuit portion for the power feeding device which processes an electrical signal of the electromagnetic wave transmitted to and received from the transmission/reception circuit portion for the power feeding device, and a power supply portion which supplies power transmitted to the power receiver. The power receiving device portion includes a transmission/reception circuit portion for the power receiving device portion which transmits and receives electromagnetic waves, a signal processing circuit portion for the power receiving device portion which processes an electrical signal of the electromagnetic wave transmitted to and received from the transmission/reception circuit portion for the power receiving device portion, a memory portion having identification information of the power receiver, a power storage portion including a secondary battery which stores power transmitted from the power feeding device, and a detection portion which detects voltage, current, or voltage and current of the secondary battery. The signal processing circuit portion for the power feeding device has an identification function of identifying the identification information and a power transmission control function of controlling power transmitted to the power receiver. The transmission/reception circuit portion for the power receiving device portion has a position detection function of detecting a position of the power receiver and a power reception control function of controlling power received from the power feeding device.

In the above structure, the transmission/reception circuit portion for the power feeding device and the transmission/reception circuit portion for the power receiving device portion each include an antenna circuit, a rectifier circuit, a modulation circuit, a demodulation circuit, and an oscillator circuit.

An embodiment of a power feeding method disclosed in this specification includes a first step of recognizing identification information of a power receiver by a power feeding device, a second step of detecting the position of the power receiver and transmitting position detection information of the power receiver to the power feeding device, a third step of adjusting the strength of transmitted power on the basis of the identification information and the position detection information and transmitting the power to the power receiver, and a fourth step of receiving and storing the transmitted power in a secondary battery of a power storage portion.

The power receiver may detect voltage, current, or voltage and current of the secondary battery and transmit a power receiving request signal or a power receiving end signal to the power feeding device in accordance with the detection information. Further, the power receiver can receive a position detection signal from the power feeding device and detect the strength of the position detection signal to detect the position of the power feeding device.

The power feeding system and the wireless power feeding method in this specification can be applied to a plurality of power feeding devices and a plurality of power receivers. For example, in the case where the power feeding device cannot receive a signal from the power receiver for a certain time or more, the power feeding device can transmit a signal for searching the power receiver having the identification information to another power feeding device and power transmission from the another power feeding device which can communicate with the power receiver to the power receiver can be performed.

In power feeding between the power feeding device and the power receiver, power feeding is performed based on identification information and position information of the power receiver; thus, a power feeding user on the power receiving side can be determined or managed and the amount of power supplied to the power receiver can be appropriately controlled.

Therefore, a power feeding system and a power feeding method which are higher convenient for a power feeding user can be provided.

A power feeding system and a power feeding method which can offer efficient services by a company on the power feeding side can be provided.

DETAILED DESCRIPTION OF THE INVENTION

Hereinafter, embodiments of the present invention will be described in detail with reference to the drawings. Note that the present invention is not limited to the following description, and it will be easily understood by those skilled in the art that modes and details disclosed herein can be modified in various ways without departing from the spirit and the scope of the present invention. Thus, the present invention should not be construed as being limited to the following description of the embodiments.

Note that the ordinal numbers such as "first", "second", and "third" in this specification are used for convenience and do not denote the order of steps or the stacking order of layers. In addition, the ordinal numbers in this specification do not denote particular names which specify the present invention.

Embodiment 1

In this embodiment, an embodiment of a wireless power feeding system and a wireless power feeding method is described with reference to FIG. 1, FIG. 2, and FIG. 3.

Figure 1:
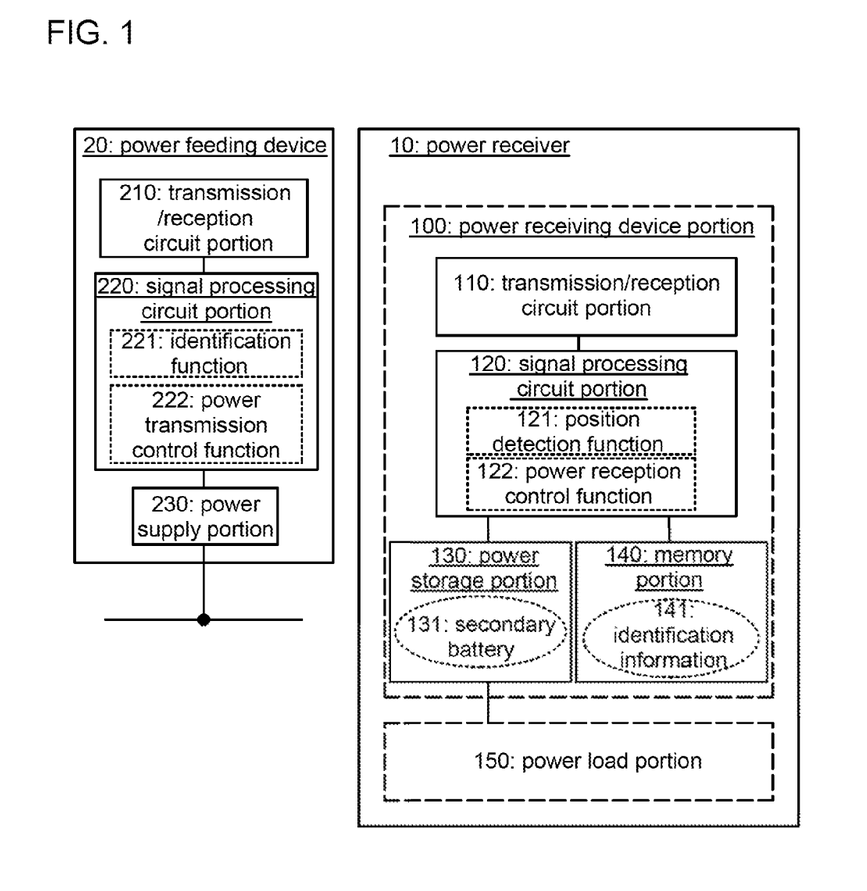
FIG. 1 illustrates an embodiment of a wireless power feeding system and a wireless power feeding method.
Figure 2:
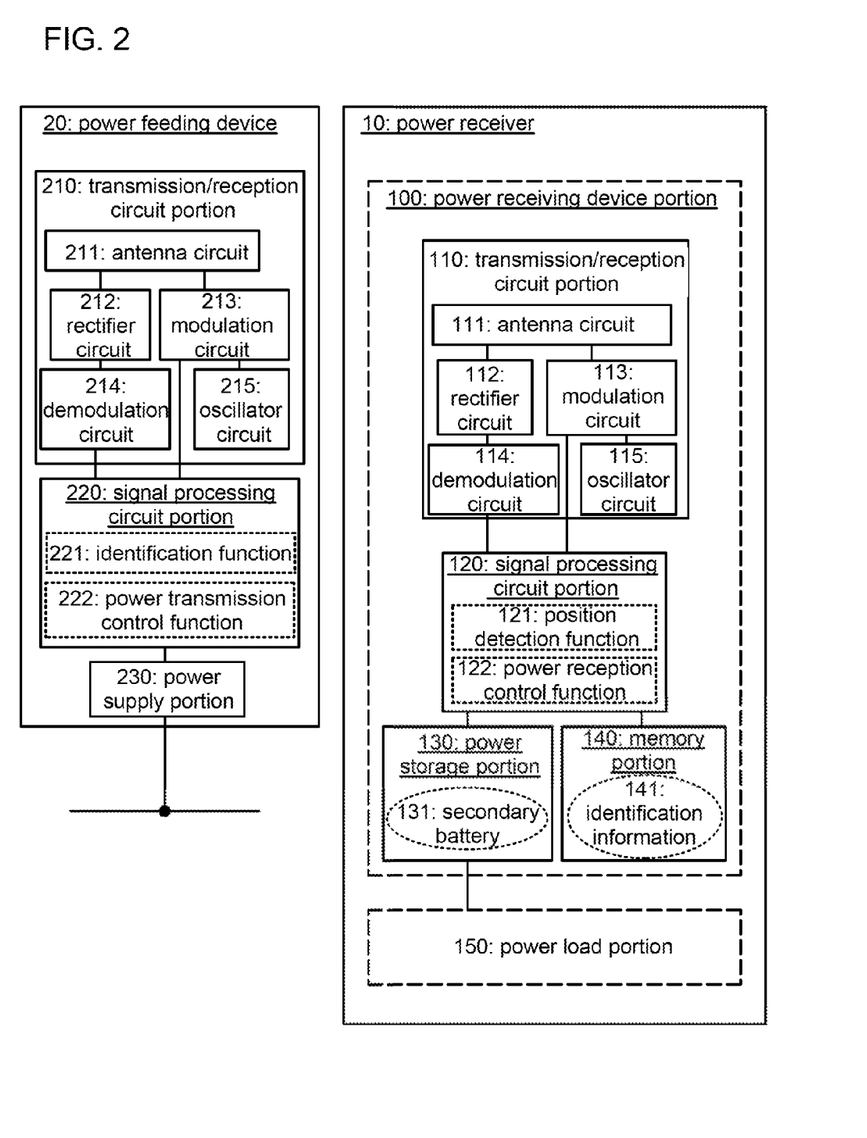
FIG. 2 illustrates an embodiment of a wireless power feeding system and a wireless power feeding method.

FIG. 1 and FIG. 2 each illustrate components of a power feeding device and a power receiver which form the wireless power feeding system in this embodiment in independent brooks which are classified according to their functions. However, a component and a function are not necessarily a one-to-one relation, and a power feeding system may operate by relating a plurality of components and a plurality of functions to each other.

In the wireless power feeding system in FIG. 1, a power feeding device 20 and a power receiver 10 transmit and receive electrical signals wirelessly (by an electromagnetic wave), and power is supplied from the power feeding device 20 to the power receiver 10 without contact.

The power feeding device 20 includes a transmission/reception circuit portion 210 which transmits and receives electromagnetic waves, a signal processing circuit portion 220 which processes electrical signals of the transmitted and received electromagnetic waves, and a power supply portion 230 which supplies power transmitted to the power receiver 10.

Note that FIG. 2 shows a more detailed specific example of the transmission/reception circuit portion 210. In FIG. 2, the transmission/reception circuit portion 210 includes an antenna circuit 211, a rectifier circuit 212, a modulation circuit 213, a demodulation circuit 214, and an oscillator circuit 215.

An electromagnetic wave (signal) received by the antenna circuit 211 is converted into an electrical signal by the antenna circuit 211 and rectified in the rectifier circuit 212. The rectified signal is demodulated in the demodulation circuit 214 and then transmitted to the signal processing circuit portion 220. On the other hand, the modulation circuit 213 applies voltage to the antenna circuit 211 in accordance with a signal with a constant frequency generated in the oscillator circuit 215, whereby a transmitter signal generated in the signal processing circuit portion 220 is transmitted from the antenna circuit 211 to the power receiver 10 as an electromagnetic wave (signal).

In the case where a transmitter signal is an electric power signal for power transmission, the signal processing circuit portion 220 receives power from the power supply portion 230. The power supply portion 230 is connected to a power supply network or a power generation system in order to supply power to the power receiver 10.

The power receiver 10 includes a power receiving device portion 100 and a power load portion 150. The power receiving device portion 100 includes a transmission/reception circuit portion 110 which transmits and receives electromagnetic waves, a signal processing circuit portion 120 which processes electrical signals of the transmitted and received electromagnetic waves, a memory portion 140 having identification information 141 of the power receiver 10, and a power storage portion 130 including a secondary battery 131 which stores power transmitted from the power feeding device 20. Note that FIG. 2 shows a more detailed specific example of the transmission/reception circuit portion 110. In FIG. 2, the transmission/reception circuit portion 110 includes an antenna circuit 111, a rectifier circuit 112, a modulation circuit 113, a demodulation circuit 114, and an oscillator circuit 115.

An electromagnetic wave (signal) received by the antenna circuit 111 is converted into an electrical signal by the antenna circuit 111 and rectified in the rectifier circuit 112. The rectified signal is demodulated in the demodulation circuit 114 and then transmitted to the signal processing circuit portion 120. On the other hand, the modulation circuit 113 applies voltage to the antenna circuit 111 in accordance with a signal with a constant frequency generated in the oscillator circuit 115, whereby a transmitter signal generated in the signal processing circuit portion 120 is transmitted from the antenna circuit 111 to the power feeding device 20 as an electromagnetic wave (signal).

In the case where the received electromagnetic wave is an electromagnetic wave for power reception, it is converted into an electrical signal by the antenna circuit 111 and rectified in the rectifier circuit 112, and then stored in the secondary battery 131 of the power storage portion 130 via the signal processing circuit portion 120, as power (electric energy).

The secondary battery 131 is a charge storage means. For example, a lead-acid battery, a nickel-cadmium battery, a nickel-hydride battery, or a lithium-ion battery can be used.

Note that in block diagrams in FIG. 1 and FIG. 2, a DC-DC converter can be provided as appropriate. In addition, in the power storage portion 130, a power supply circuit or an overcharge control circuit for controlling operation of the power supply circuit so as to prevent overcharging of the secondary battery 131 may be provided as appropriate, and the power supply circuit can supply power (electric energy) stored in the secondary battery 131, which is made constant, to the power load portion 150.

As a modulation method used by the modulation circuit 113 or the modulation circuit 213, any of a variety of methods such as amplitude modulation, frequency modulation, and phase modulation can be employed.

The signal processing circuit portion 220 in the power feeding device 20 has an identification function 221 of identifying the identification information 141 of the power receiver 10 and a power transmission control function 222 of controlling power transmitted to the power receiver 10.

On the other hand, the signal processing circuit portion 120 in the power receiver 10 has a position detection function 121 of detecting the position of the power receiver 10 to figure out the positional relation between the power feeding device 20 and the power receiver 10 and a power reception control function 122 of to controlling power received from the power feeding device 20.

The power feeding device 20 which wirelessly supplies power to the power receiver 10 manages the power receiver 10 using the identification information 141 of the power receiver 10 and controls power transmitted to the power receiver 10 on the basis of position information of the power receiver 10.

An embodiment of a wireless power feeding method is described with reference to a flow chart of FIG. 3. Note that a power feeding device K corresponds to the power feeding device 20 in FIG. 1 and FIG. 2 and a power receiver J corresponds to the power receiver 10 in FIG. 1 and FIG. 2.

First, the power receiver J transmits identification information to the power feeding device K (JA1: transmission of identification information), and the power feeding device K receives the identification information of the power receiver J (KA1: reception of the identification information). The power feeding device K inquires about and checks the received identification information (KA2: reference check of the identification information), and identifies the power receiver J (A: identification information recognition step). The power feeding device K may store information for the identification in a memory portion in the power feeding device K in advance. Alternatively, in performing identification, the power feeding device K may communicate with another management server or the like and perform identification on the basis of information from the server.

Alternatively, communication between the power feeding device K and the power receiver J may start from the power feeding device K. For example, the power feeding device K may obtain identification information of the power receiver J from the power receiver J, and transmit a signal for asking identification information to the power receiver J and start communication in order to determine (search for) the power receiver J having the identification information.

Next, the power feeding device K transmits a position detection signal to the power receiver J so that appropriate supply to the power receiver J is performed (KB1: transmission of a position detection signal). The power receiver J receives a position detection signal (JB1: reception of a position detection signal), detects a positional relation with the power feeding device K on the basis of the strength and time of the received electrical signal (JB2: position detection), and transmits the position detection information to the power feeding device K (JB3: transmission of the position detection information) (B: position detection step). The strength of the position detection signal received by the power receiver J has, as information, positional relations such as the distance between the power feeding device K and the power receiver J and the directions of the power feeding device K and the power receiver J. Thus, with the use of the position detection signal, the positional relation between the power feeding device K and the power receiver J can be figured out.

The power feeding device K receives the position detection information detected by the power receiver J (KC1: reception of the position detection information), and adjusts the strength of an electric power signal to be transmitted based on the identification information and the position detection information (KC2: adjustment of the power transmission strength). For example, by reading and considering the available amount of power storage of the secondary battery 131 of the power receiver J on the basis of the identification information and the distance and direction to the power receiver J on the basis of the position detection information, the strength and frequency of a transmitted electromagnetic wave, a power transmission period, and the like are controlled. Specific information and position of the power receiver J are figured out in this manner, whereby appropriate power transmission can be conducted. Thus, waste of power due to excessive power transmission and deterioration of the secondary battery 131 caused by supply of the amount of power storage or more can be reduced. As a result, efficient and convenient power feeding can be performed for both the power feeding device K and the power receiver J.

The power feeding device K transmits a power transmission start signal to the power receiver J (KC3: transmission of a power transmission start signal), and the power receiver J receives the power transmission start signal (JD1: reception of the power transmission start signal) and transmits a power reception start signal after preparation for power reception is completed (JD2: transmission of a power reception start signal). The power feeding device K receives the power reception start signal from the power receiver J (KC4: reception of the power reception start signal) and starts power transmission (KC5: start of power transmission). When the power transmission is performed by the power feeding device K, the power receiver J starts power reception (JD3: start of power reception).

The power feeding device K transmits a power transmission end signal to the power receiver J after transmitting an appropriate transmission power amount on the basis of the power transmission control function 222 (KC6: transmission of a power transmission end signal). The power receiver J receives the power transmission end signal from the power feeding device K (JD4: reception of the power transmission end signal), transmits a power reception end signal to the power feeding device K (JD5: transmission of the power reception end signal), and ends the power reception (JD6: end of the power reception) (D: power reception control step). The power feeding device K receives the power reception end signal from the power receiver J (KC7: reception of the power reception end signal) and ends the power transmission (KC8: end of the power transmission) (C: power transmission control step).

Note that in the power feeding device K, the start or end of power transmission may be performed at the same time as transmission of a power transmission start signal or transmission of a power transmission end signal. The start or end of power reception may also be performed at the same time as transmission of a power reception start signal or transmission of a power reception end signal. Since the power transmission and the power reception relate to each other, the power reception of the power receiver J can start at the same time as the start of power transmission of the power feeding device K and the power reception of the power receiver J can end at the same time as the end of the power transmission of the power feeding device K. FIG. 3 shows an example where the power feeding device K transmits the end of the power feeding to the power receiver J to end the power transmission, and the power receiver J can request the end, of the power feeding of the power feeding device K to end the power transmission of the power feeding device K.

As a result, the power load portion 150 can operate using power stored in the secondary battery 131 of the power storage portion 130 in the power receiving device portion 100. In this specification, a power receiver means an object which operates using received power as a prime mover, and examples of the power receiver include portable electric devices such as mobile phones, laptop personal computers, cameras such as digital cameras or digital video cameras, digital photo frames, portable game machines, personal digital assistants, and e-book readers, and transportation means driven by an electric motor using power (automobiles (automatic two-wheeled vehicles, three or more-wheeled automobiles), motorized bicycles including motor-assisted bicycles, aircrafts, ships, and railroad cars).

Figure 9:
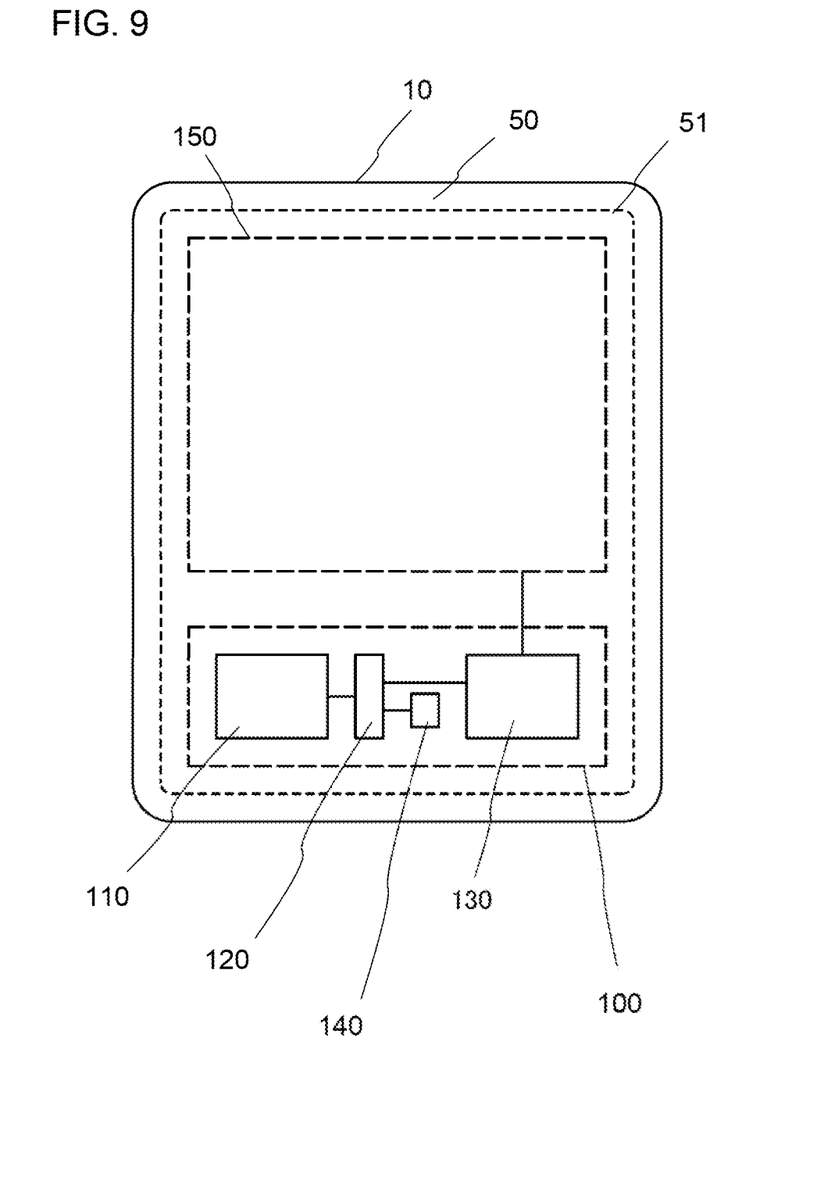
FIG. 9 illustrates an embodiment of a power receiver.

FIG. 9 illustrates a personal digital assistant (PDA) as an example of the power receiver. The power receiver 10 in FIG. 9 is a personal digital assistant including a display panel 51 in a housing 50. The power receiving device portion 100 and the power load portion 150 are provided under the display panel 51 on a surface of the housing 50. The power receiving device portion 100 includes the transmission/reception circuit portion 110 which includes the antenna circuit 111, the rectifier circuit 112, the modulation circuit 113, the demodulation circuit 114, and the oscillator circuit 115, the signal processing circuit portion 120, the memory portion 140, and the power storage portion 130 including the secondary battery 131. An electromagnetic wave received by the transmission/reception circuit portion 110 is stored in the secondary battery 131 of the power storage portion 130 via the signal processing circuit portion 120. When power stored in the secondary battery 131 is supplied to the power load portion 150, a semiconductor integrated circuit and the like provided in the power load portion 150 are driven to display an image on the display panel 51; thus, the power receiver 10 can operate as a personal digital assistant.

In this specification, the electromagnetic wave for supply has no particular limitation on its frequency and may have any band of frequency as long as power can be transmitted. For example, the electromagnetic wave for supply may have any of an LF band of 135 kHz (long wave), an HF band of 13.56 MHz, a UHF band of 900 MHz to 1 GHz, and a microwave band of 2.45 GHz.

In this specification, electromagnetic waves used as a variety of signals (an electrical signal, a position detection signal, and the like which transmit identification information and position detection information) may have the same frequency band as a power feeding electromagnetic wave or a frequency band different from that of the power feeding electromagnetic wave. Note that in the case where a different frequency band is used, an antenna corresponding to the frequency is preferably provided.

In this specification, a transmission method of electromagnetic waves may be appropriately selected from a variety of methods including an electromagnetic coupling method, an electromagnetic induction method, a resonance method, and a microwave method. In order to prevent energy loss due to foreign substances containing moisture, such as rain and mud, the electromagnetic induction method or the resonance method using a low frequency band, specifically, frequencies of a short wave of 3 MHz to 30 MHz, a medium wave of 300 kHz to 3 MHz, a long wave of 30 kHz to 300 kHz, or a very-low wave of 3 kHz to 30 kHz, is preferably used.

As described above, by the power feeding system and the power feeding method in this embodiment, a power receiver user can obtain more convenience and higher added values.

By a company on the power feeding side, a power feeding system and a power feeding method which can offer efficient and various services can be provided.

Embodiment 2

In this embodiment, another embodiment of the wireless power feeding system and the wireless power feeding method is described with reference to FIG. 4, FIG. 5, and FIGS. 6A and 6B.

Figure 4:
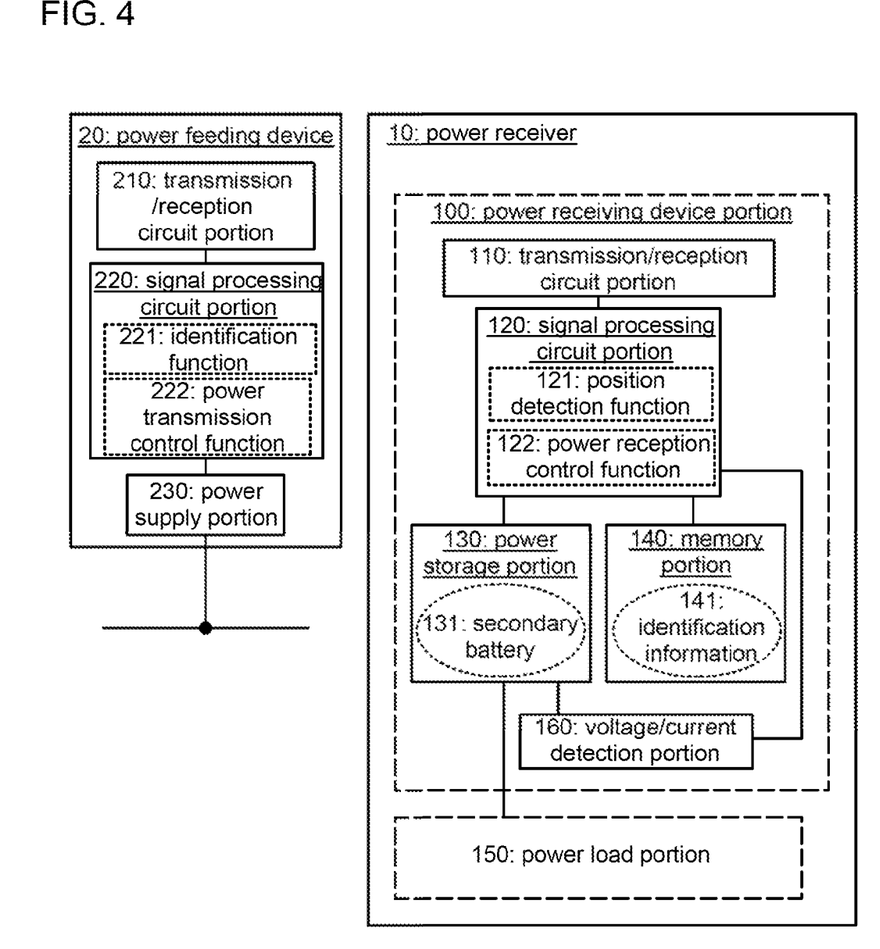
FIG. 4 illustrates an embodiment of a wireless power feeding system and a wireless power feeding method.

FIG. 4 illustrates components of a power feeding device and a power receiver which form the wireless power feeding system in this embodiment in independent blocks by classifying according to their functions. FIG. 4 shows an example where a detection portion (a voltage/current detection portion 160) which detects the amount of power storage of the secondary battery 131 of the power storage portion 130 is provided in the wireless power feeding system in FIG. 1 described in Embodiment 1. The same portions as or portions having functions similar to those in Embodiment 1 are similar to those in Embodiment 1 and repetitive description will be omitted. In addition, detailed description of the same portions is not repeated.

The voltage/current detection portion 160 detects voltage, current, or voltage and current of the secondary battery 131 of the power storage portion 130 to figure out the amount of power storage of the secondary battery 131 and transmits the information to the signal processing circuit portion 120, so that the signal processing circuit portion 120 controls power reception.

Figure 5:
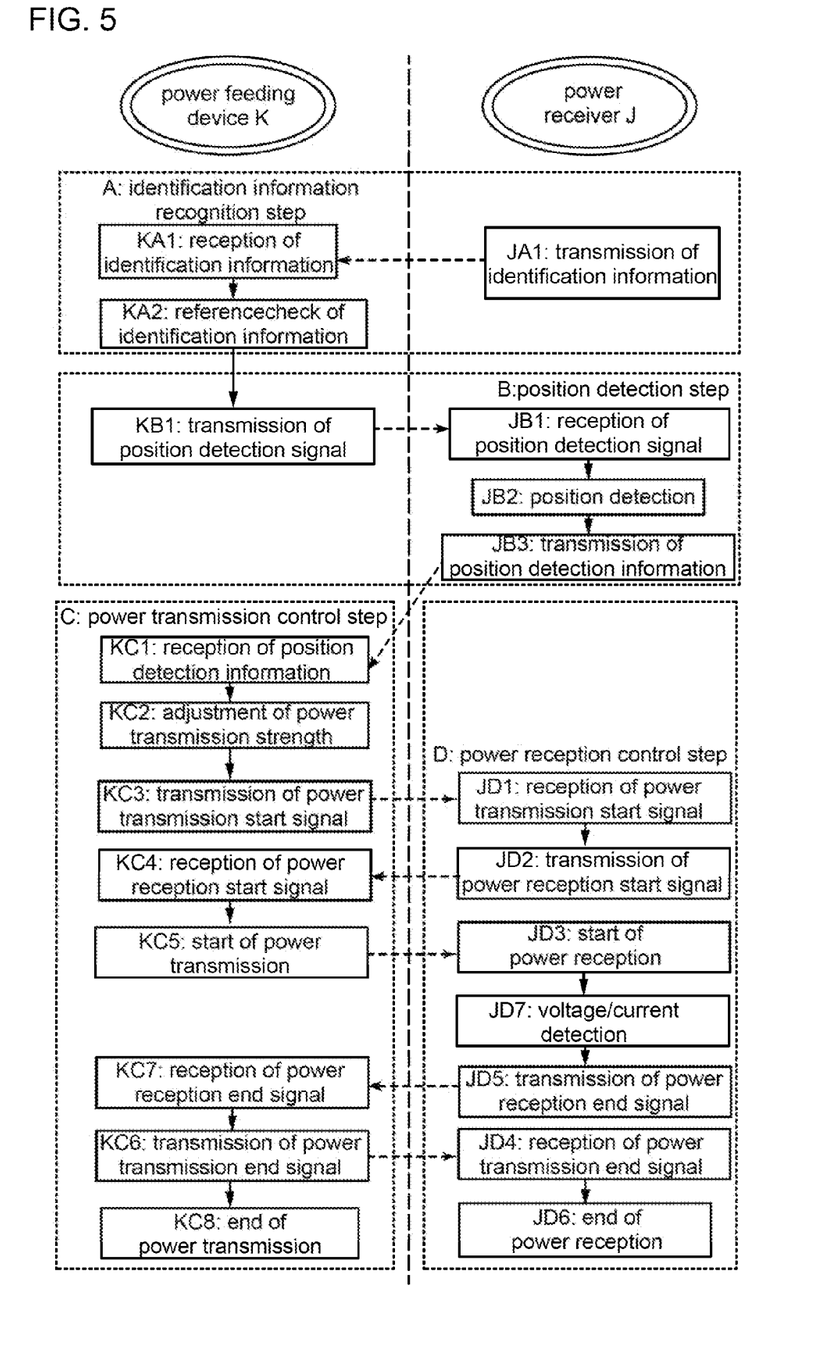
FIG. 5 illustrates an embodiment of a wireless power feeding system and a wireless power feeding method.

An embodiment of a wireless power feeding method is described with reference to a flow chart of FIG. 5. Note that a power feeding device K corresponds to the power feeding device 20 in FIG. 4 and a power receiver J corresponds to the power receiver 10 in FIG. 4.

Figure 3:
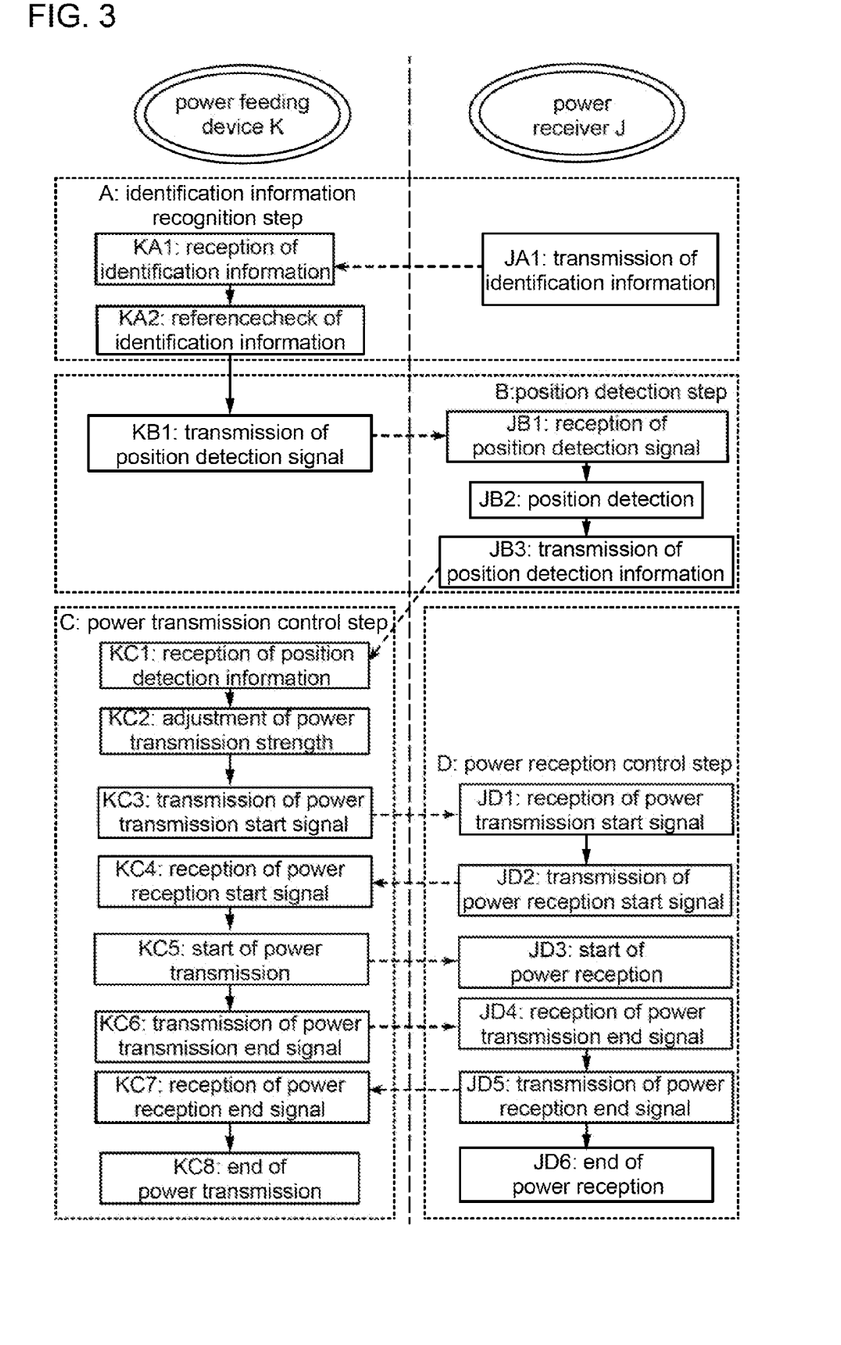
FIG. 3 illustrates an embodiment of a wireless power feeding system and a wireless power feeding method.

An identification information recognition step and a position detection step are the same as those in FIG. 3 of Embodiment 1 and thus omitted.

A power transmission control step and a power reception control step are described.

The power feeding device K receives the position detection information detected by the power receiver J (KC1: reception of the position detection information), and adjusts the strength of an electric power signal to be transmitted based on the identification information and the position detection information (KC2: adjustment of the power transmission strength). For example, by reading and considering the available amount of power storage of the secondary battery 131 of the power receiver J on the basis of the identification information and the distance and direction to the power receiver J on the basis of the position detection information, the strength and frequency of a transmitted electromagnetic wave, a power transmission period, and the like are controlled.

The power feeding device K transmits a power transmission start signal to the power receiver J (KC3: transmission of a power transmission start signal), and the power receiver J receives the power transmission start signal (JD1: reception of the power transmission start signal) and transmits a power reception start signal after preparation for power reception is completed (JD2: transmission of a power reception start signal). The power feeding device K receives the power reception start signal from the power receiver J (KC4: reception of the power reception start signal) and starts power transmission (KC5: start of power transmission). When the power transmission is performed by the power feeding device K, the power receiver J starts power reception (JD3: start of power reception).

In this embodiment, an example is shown in which detection information of the amount of power storage of the secondary battery 131 detected by the voltage/current detection portion 160 is also used for power feeding control. When power reception of the power receiver J starts, voltage, current, or voltage and current of the secondary battery 131 are detected by the voltage/current detection portion 160 (JD7: voltage/current detection).

The voltage/current detection portion 160 figures out the amount of power storage of the secondary battery 131 by detecting the voltage, current, or voltage and current of the secondary battery 131. When the voltage/current detection portion 160 judges that the amount of power storage thereof is over the available amount of power storage of the secondary battery 131, it transmits a power reception end signal to the power feeding device K (JD5: transmission of a power reception end signal).

The power feeding device K receives the power reception end signal from the power receiver J (KC7: reception of the power reception end signal), transmits a power transmission end signal to the power receiver J (KC6: transmission of a power transmission end signal), and ends the power transmission (KC8: power transmission end). The power receiver J receives the power transmission end signal from the power feeding device K (JD4: reception of the power transmission end signal) and ends the power reception (JD6: power reception end).

In this manner, the power receiver J can request the end of the power feeding of the power feeding device K to end the power transmission of the power feeding device K.

Figure 6A:
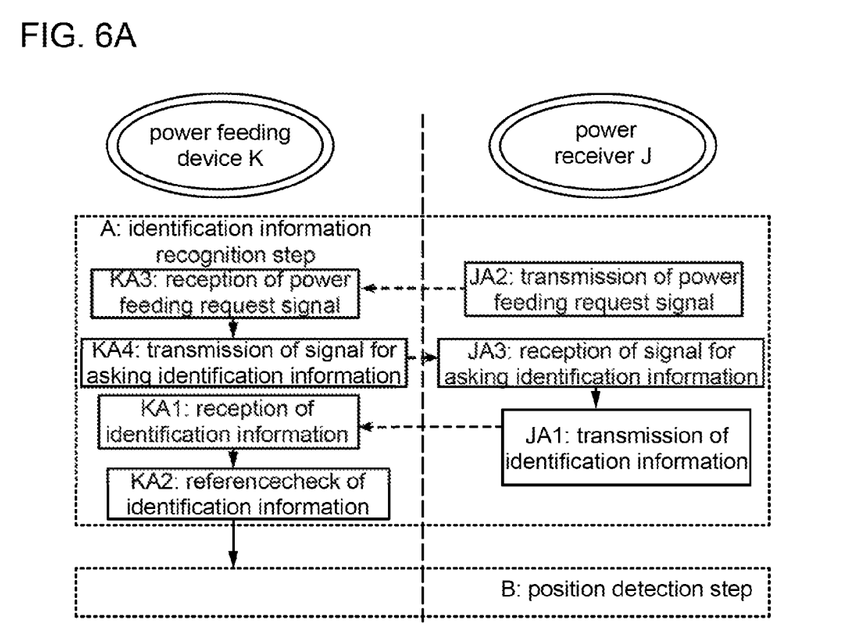
FIGS. 6A and 6B each illustrate an embodiment of a wireless power feeding system and a wireless power feeding method.

Alternatively, as in FIG. 6A, the power receiver J can request the start of power feeding of the power feeding device K and start power transmission of the power feeding device K. FIG. 6A illustrates the identification information recognition step. First, the power receiver J transmits a signal for requesting power feeding to the power feeding device K (JA2: transmission of a power feeding request signal). The power feeding device K which is placed in a position where the power feeding request signal of the power receiver J can be received receives the power feeding request signal of the power receiver J (KA3: reception of the power feeding request signal) and transmits a signal for asking identification information of the power receiver J to the power receiver J (KA4: transmission of a signal for asking identification information). The power receiver J receives the signal for asking identification information from the power feeding device K (JA3: reception of the signal for asking identification information) and transmits identification information of the power receiver J to the power feeding device K (JA1: transmission of identification information). The process proceeds to the next step, and power feeding is performed in a manner similar to the power feeding method in FIG. 3 or FIG. 5.

A user may control transmission of a power receiving request signal from the power receiver J considering the amount of power storage of the secondary battery 131 of the power receiver J. Alternatively, the transmission of a power receiving request signal from the power receiver J may be set to perform automatically according to the amount of power storage of the secondary battery 131.

Figure 6B:
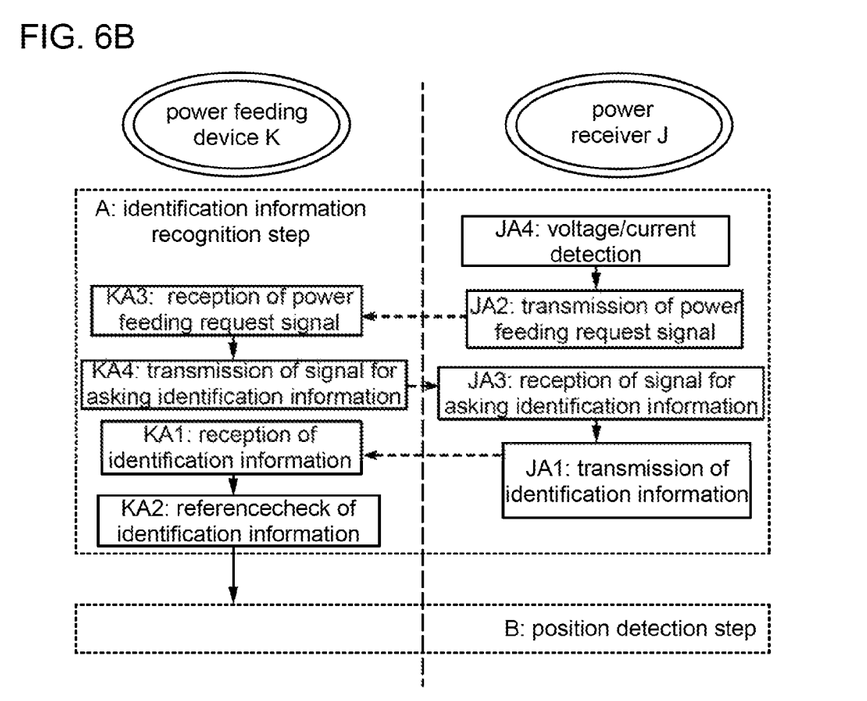

For example, as in FIG. 6B, the power receiver J detects the voltage, current, or voltage and current of the secondary battery 131 in the voltage/current detection portion 160 (JA4: voltage/current detection), and when the power receiver J judges that the amount of power storage of the secondary battery 131 is smaller than the certain amount of power storage, it transmits a power feeding request signal to the power feeding device K (JA2: transmission of a power feeding request signal). The process proceeds to the next step, and power feeding is performed in a manner similar to the power feeding method in FIG. 6A, and FIG. 3 or FIG. 5.

Specific information and position of the power receiver J are figured out in this manner and the amount of power storage of the secondary battery 131 is figured out, whereby power transmission which is appropriate to the user request can be conducted. Thus, waste of power due to excessive power transmission and deterioration of the secondary battery 131 caused by supply of the amount of power storage or more can be reduced. As a result, efficient and convenient power feeding can be performed for both the power feeding device K and the power receiver J.

As described above, by the power feeding system and the power feeding method in this embodiment, a power receiver user can obtain more convenience and higher added values.

By a company on the power feeding side, a power feeding system and a power feeding method which can offer efficient and various services can be provided.

This embodiment can be implemented in appropriate combination with any of the structures described in the other embodiments.

Embodiment 3

Figure 7:
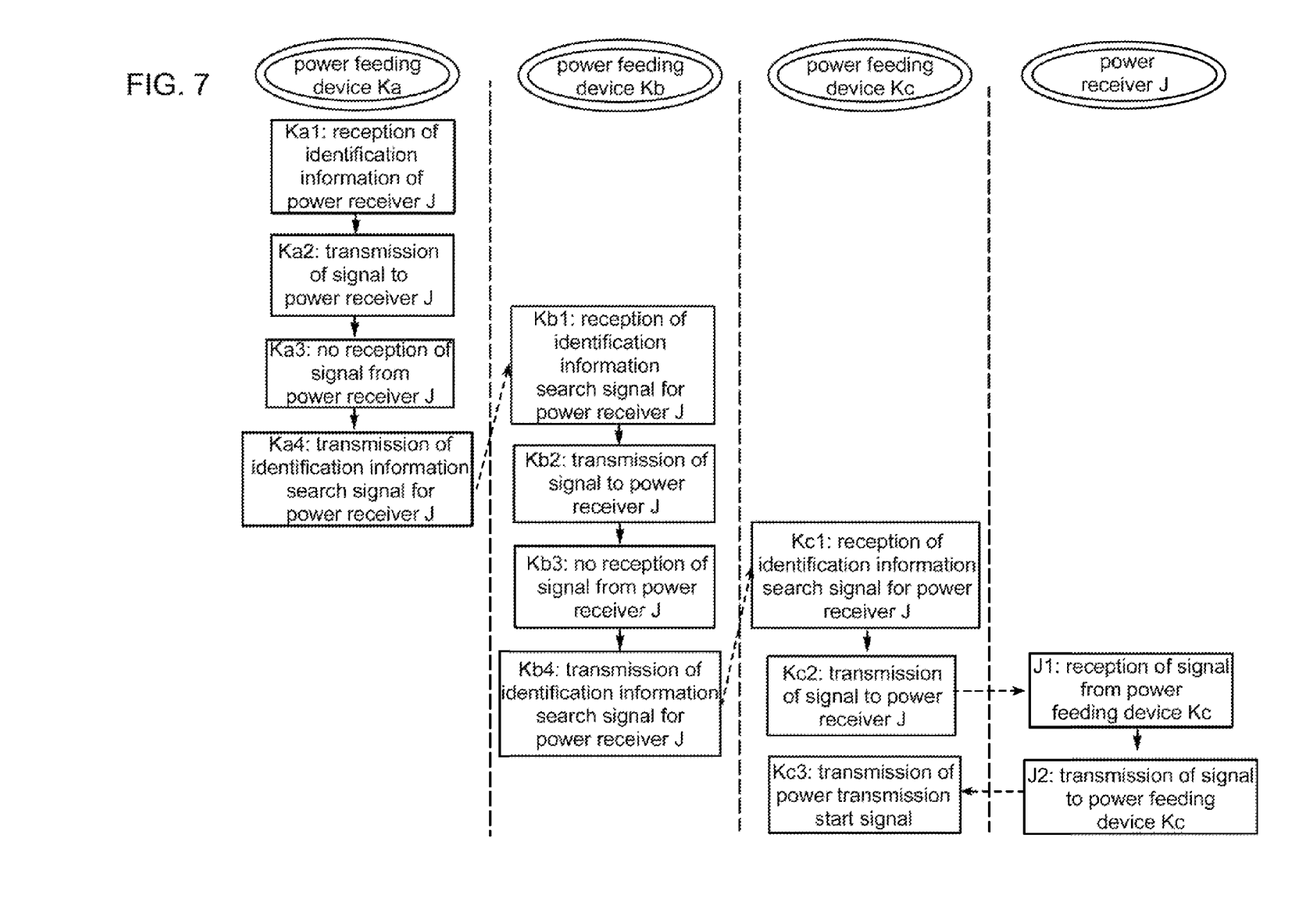
FIG. 7 illustrates an embodiment of a wireless power feeding system and a wireless power feeding method.

In this embodiment, another embodiment of the wireless power feeding system and the wireless power feeding method is described with reference to FIG. 7 and FIGS. 8A and 8B. In FIG. 7, reference numerals are abbreviated.

The power feeding system and the power feeding method in this specification can be applied to a plurality of power feeding devices and a plurality of power receivers. This embodiment shows an example where the power feeding system and the power feeding method described in Embodiment 1 or 2 are applied to a plurality of power feeding devices and a power receiver. The same portions as or portions having functions similar to those in Embodiment 1 or 2 are similar to those in Embodiment 1 or 2 and repetitive description will be omitted. In addition, detailed description of the same portions is not repeated.

Figure 8A:
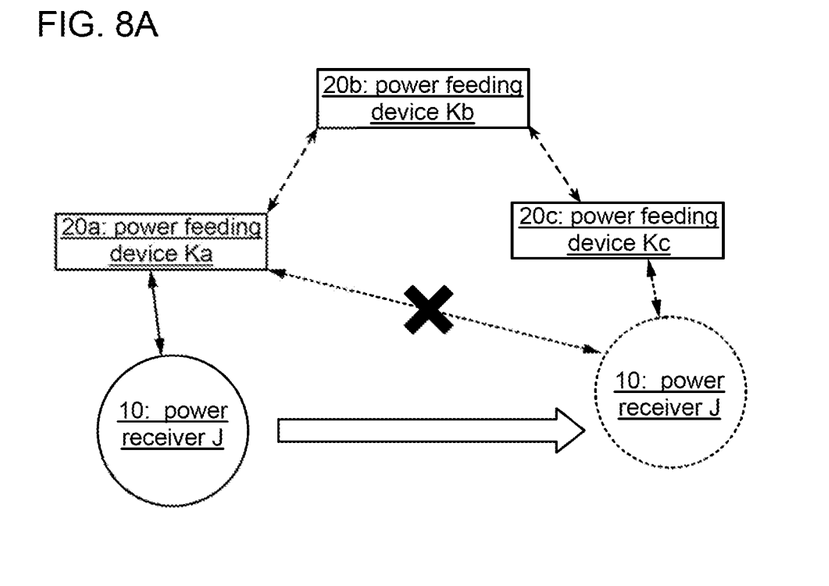
FIGS. 8A and 8B each illustrate an embodiment of a wireless power feeding system and a wireless power feeding method.
Figure 8B:
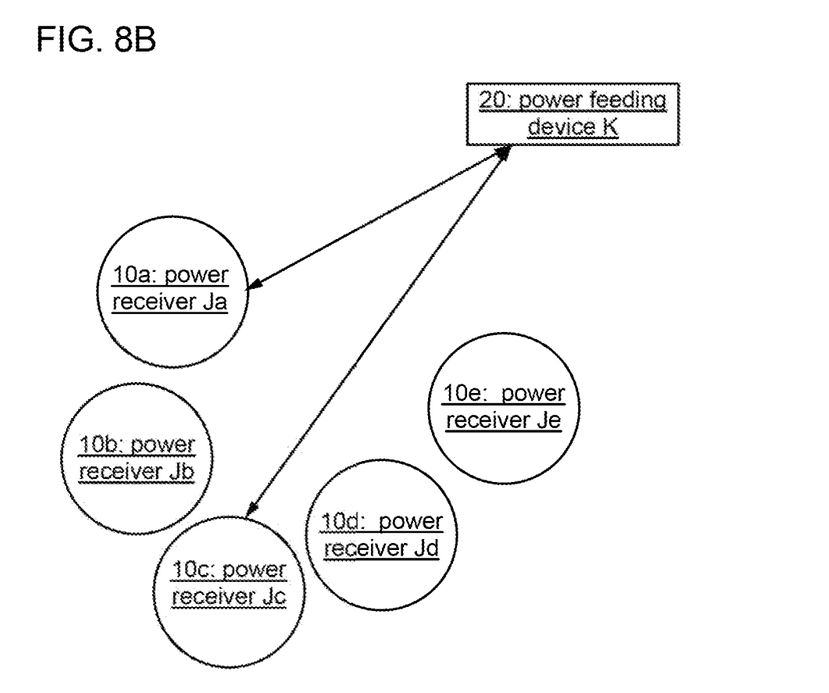

FIG. 7 and FIG. 8A show an example where power feeding is performed on a moving power receiver J10 by a power feeding device Ka20$a$, a power feeding device Kb20$b$, and a power feeding device Kc20$c$.

The power receiver J10 circled by a solid line in FIG. 8A performs transmission and reception of electromagnetic waves including wireless power transmission with the power feeding device Ka20$a$ capable of communication.

After that, the power receiver J10 moves along a direction indicated by an arrow to a position of the power receiver J10 circled by a dotted line in FIG. 8A. The power feeding device Ka20$a$ receives identification information of the power receiver J10 (Ka1: reception of identification information of the power receiver J) and transmits a signal (including an electric power signal) to the power receiver J10 (Ka2: transmission of a signal to the power receiver J).

However, the power receiver J10 which moves out of the area in which communication with the power feeding device Ka20$a$ can be carried out cannot transmit and receive signals to/from the power feeding device Ka20$a$ and cannot receive a signal from the power receiver J10 even after a certain time passes. In the case where the power feeding device Ka20$a$ cannot receive the signal from the power receiver J10 even after the certain time passes, the power feeding device Ka20$a$ judges that the power receiver J10 moves out of the area in which communication with the power feeding device Ka20$a$ can be carried out or communication cannot be carried out because there is an obstacle between the power receiver J10 and the power feeding device Ka20$a$ (Ka3: no reception of the signal from the power receiver J) and transmits a search signal for the power receiver J10 having the identification information of the power receiver J10 to the power feeding device Kb20$b$ (Ka4: transmission of an identification information search signal for the power receiver J).

The power feeding device Kb20$b$ placed in the area in which communication with the power feeding device Ka20$a$ can be carried out receives the identification information search signal for the power receiver J10 from the power feeding device Ka20$a$ (Kb1: reception of the identification information search signal for the power receiver J) and transmits a signal to the power receiver J10 (Kb2: transmission of a signal to the power receiver J).

However, as in FIG. 8A, the power receiver J10 is out of the area in which communication with the power feeding device Kb20$b$ can be carried out and cannot receive the signal from the power feeding device Kb20$b$; therefore, the power feeding device Kb20$b$ cannot receive the signal from the power receiver J10 even after a certain time passes. In the case where the power feeding device Kb20$b$ cannot receive the signal from the power receiver J10 even after the certain time passes, the power feeding device Kb20$b$ judges that the power receiver J10 is placed out of the area in which communication with the power feeding device Kb20$b$ can be carried out or communication cannot be carried out because there is an obstacle between the power receiver J10 and the power feeding device Kb20$b$ (Kb3: no reception of the signal from the power receiver J) and transmits a search signal for the power receiver J10 having the identification information of the power receiver J10 to the power feeding device Kc20$c$ (Kb4: transmission of an identification information search signal for the power receiver J).

The power feeding device Kc20$c$ placed in the area in which communication with the power feeding device Kb20$b$ can be carried out receives the identification information search signal for the power receiver J10 from the power feeding device Kb20$b$ (Kc1: reception of the identification information search signal for the power receiver J) and transmits a signal to the power receiver J10 (Kc2: transmission of a signal to the power receiver J).

The power receiver J10 circled by the dotted line is placed in the area in which communication with the power feeding device Kc20$c$ can be carried out; thus, the power receiver J10 receives the signal from the power feeding device Kc20$c$ (J1: reception of the signal from the power feeding device Kc) and transmits a signal to the power feeding device Kc20$c$ (J2: transmission of a signal to the power feeding device Kc).

The power feeding device Kc20$c$ receives the signal from the power receiver J10 (reception of the signal from the power receiver J). Then, the power receiver J10 circled by the dotted line transmits and receives electromagnetic waves including wireless power transmission with the power feeding device Kc20$c$ capable of communication.

Alternatively, the power feeding device Kc20$c$ may transmit, to the power feeding device Kb20$b$ or the power feeding device Ka20$a$, that the power receiver J10 is found and the power feeding device Kc20$c$ communicates with the power receiver J10.

As described above, in the case where the power feeding device cannot receive the signal from the power receiver for a certain time or more, the power feeding device can transmit a signal for searching the power receiver having the identification information to another power feeding device and power transmission from the another power feeding device which can communicate with the power receiver to the power receiver can be performed.

Therefore, a power receiver user can perform power reception via a plurality of power feeding devices while travelling and can keep using the power receiver even while travelling over a long distance and for a long period of time.

Alternatively, in the case where a plurality of power receivers exists in the area in which communication can be carried out, power transmission can be performed only on a specific power receiver using identification information. FIG. 8B shows an example where power feeding is performed by a power feeding device K20 only on a power receiver Ja10a and a power receiver Jc10c in the power receiver Ja10a, a power receiver Jb10b, the power receiver Jc10c, a power receiver Jd10d, and a power receiver Je10e. The power feeding device K20 obtains identification information of the power receiver Ja10a, the power receiver Jb10b, the power receiver Jc10c, the power receiver Jd10d, and the power receiver Je10e, and then communication with and power feeding to the power receiver Ja10a and the power receiver Jc10c which are power feeding objects are performed based on the information.

Since identification information is figured out and power feeding is performed, a power receiver which is an object can be precisely managed, and service for a winner for a prize or the like or a subscriber can be effectively offered.

In addition, a measure for security of identification information including specific information such as personal information is preferably performed; for example, identification information is updated each power feeding, unnecessary identification information is deleted from a power feeding device when a recognition step for power feeding is finished, or communication is encoded when identification information is transmitted.

This embodiment can be implemented in appropriate combination with any of the structures described in the other embodiments.

This application is based on Japanese Patent Application serial No. 2010-138605 filed with Japan Patent Office on Jun. 17, 2010, the entire contents of which are hereby incorporated by reference.

What is claimed is:

1. A wireless power feeding system comprising a power feeding device and a power receiver which includes a power receiving device portion and a power load portion,
wherein the power feeding device comprises:
a transmission/reception circuit portion which transmits and receives an electromagnetic wave;
a signal processing circuit portion which processes an electrical signal of the electromagnetic wave transmitted to and received from the transmission/reception circuit portion; and
a power supply portion which supplies power transmitted to the power receiver,
wherein the power receiving device portion comprises:
a transmission/reception circuit portion which transmits and receives an electromagnetic wave;
a signal processing circuit portion which processes an electrical signal of the electromagnetic wave transmitted to and received from the transmission/reception circuit portion;
a memory portion including identification information of the power receiver; and
a power storage portion including a secondary battery which stores power transmitted from the power feeding device,
wherein the signal processing circuit portion in the power feeding device includes an identification function of identifying the identification information and a power transmission control function of controlling power transmitted to the power receiver, and
wherein the transmission/reception circuit portion in the power receiving device portion includes a position detection function of detecting a position of the power receiver and a power reception control function of controlling power received from the power feeding device.

2. The wireless power feeding system according to claim 1, wherein the transmission/reception circuit portion in the power feeding device and the transmission/reception circuit portion in the power receiving device portion each comprise an antenna circuit, a rectifier circuit, a modulation circuit, a demodulation circuit, and an oscillator circuit.

3. A wireless power feeding system comprising a power feeding device and a power receiver which includes a power receiving device portion and a power load portion,
wherein the power feeding device comprises:
a transmission/reception circuit portion which transmits and receives an electromagnetic wave;
a signal processing circuit portion which processes an electrical signal of the electromagnetic wave transmitted to and received from the transmission/reception circuit portion; and
a power supply portion which supplies power transmitted to the power receiver,
wherein the power receiving device portion comprises:
a transmission/reception circuit portion which transmits and receives an electromagnetic wave;
a signal processing circuit portion which processes an electrical signal of the electromagnetic wave transmitted to and received from the transmission/reception circuit portion;
a memory portion including identification information of the power receiver;
a power storage portion including a secondary battery which stores power transmitted from the power feeding device; and
a detection portion which detects at least one of voltage and current of the secondary battery,
wherein the signal processing circuit portion in the power feeding device includes an identification function of identifying the identification information and a power transmission control function of controlling power transmitted to the power receiver, and
wherein the transmission/reception circuit portion in the power receiving device portion includes a position detection function of detecting a position of the power receiver and a power reception control function of controlling power received from the power feeding device.

4. The wireless power feeding system according to claim 3, wherein the transmission/reception circuit portion in the power feeding device and the transmission/reception circuit portion in the power receiving device portion each comprise an antenna circuit, a rectifier circuit, a modulation circuit, a demodulation circuit, and an oscillator circuit.

5. A wireless power feeding method comprising:
recognizing identification information of a power receiver by a power feeding device;

detecting a position of the power receiver, and transmitting position detection information of the power receiver to the power feeding device;

adjusting a strength of transmitted power based on the identification information and the position detection information, and transmitting power to the power receiver; and receiving and storing the transmitted power in a secondary battery of a power storage portion.

6. The wireless power feeding method according to claim 5, wherein the power receiver detects at least one of voltage and current of the secondary battery, and transmits a power receiving request signal or a power receiving end signal to the power feeding device based on the position detection information.

7. The wireless power feeding method according to claim 5, wherein the power receiver receives a position detection signal from the power feeding device and detects a strength of the position detection signal to detect a position of the power feeding device.

8. The wireless power feeding method according to claim 5, wherein the power feeding device transmits a signal for searching the power receiver which includes the identification information to another power feeding device when the power feeding device cannot receive a signal from the power receiver for a certain time or more.

* * * * *